United States Patent Office 2,785,931
Patented Mar. 19, 1957

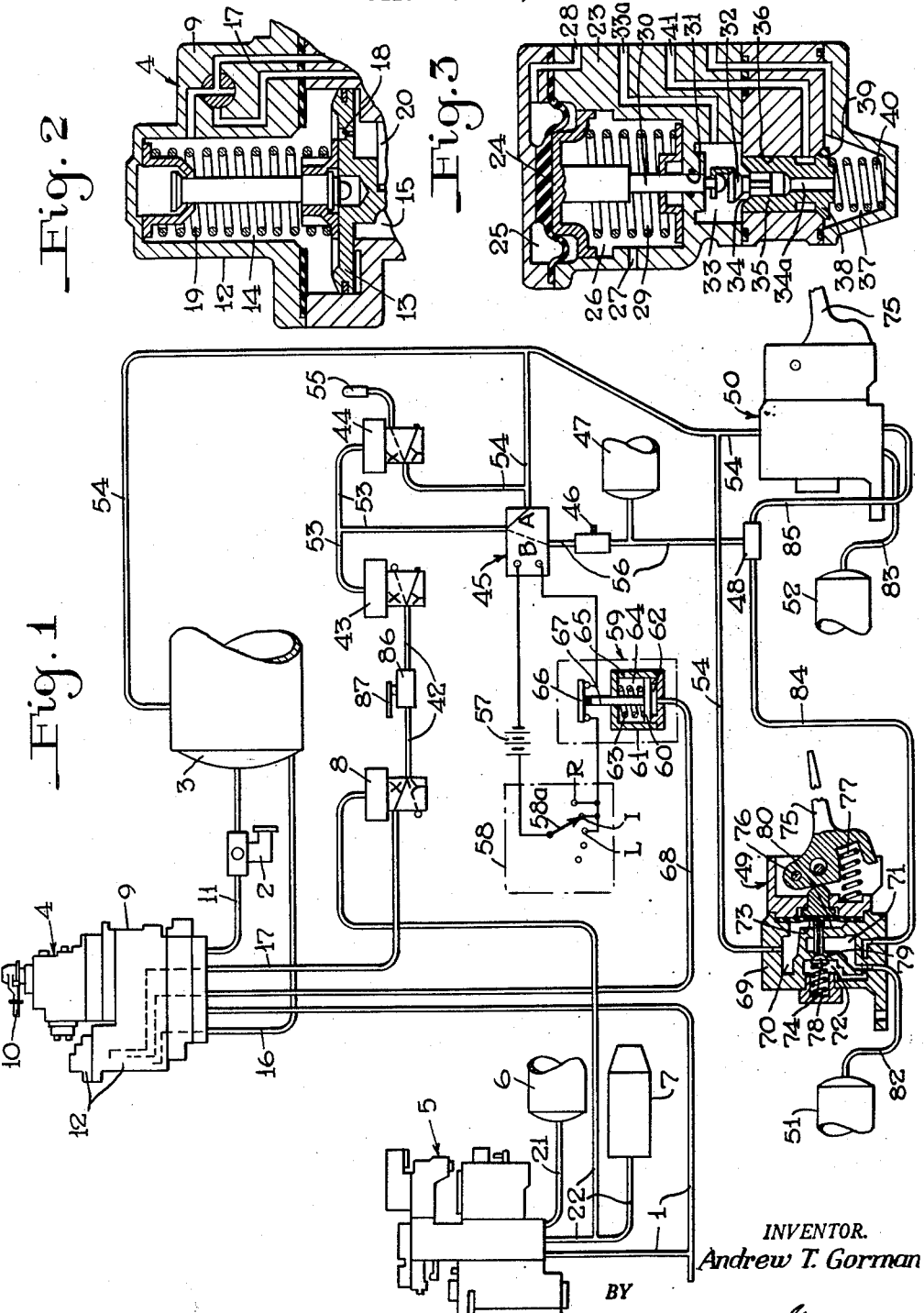

2,785,931

FLUID PRESSURE BRAKE APPARATUS WITH SAFETY CONTROL FEATURE

Andrew T. Gorman, Pitcairn, Pa., assignor to Westinghouse Air Brake Company, Wilmerding, Pa., a corporation of Pennsylvania Application December 16, 1953, Serial No. 398,506

9 Claims. (Cl. 303—19)

This invention relates to fluid pressure brakes and more particularly to fluid pressure brake apparatus having automatic safety control features.

Many railway vehicles are equipped with fluid pressure brake apparatus which includes a "dead man" or safety control device operative to cause a safety control brake application, unless a manually or foot-controlled lever is depressed by the engineman at all times except under certain conditions during a manual brake application. If the engineman places a tool box or other object on the lever or if he slumps, when stricken, in such a way as to maintain the lever depressed, the safety control feature can be rendered completely inoperative. If, on the other hand, the engineman momentarily and inadvertently removes his hand or foot from the lever a safety control brake application will occur.

It is therefore an object of this invention to provide an improved apparatus of the above type embodying a safety control arrangement which will prevent continuous nullification of the safety control feature, yet not effect a safety control brake application if the engineman momentarily removes his hand or foot from the lever.

Another object of the invention is to provide such an apparatus which requires the engineman to perform some act periodically in order to prevent a safety control brake application and yet affords him a reasonable time within which to perform such act by giving him a preliminary warning.

A further object of the invention is to provide optional means for automatically cutting out the safety control feature under preselected conditions of speed and/or direction of movement of a locomotive.

Other objects and advantages will become apparent from the following more detailed description of the invention.

In the accompanying drawing: Fig. 1 is a diagrammatic view, partly in outline and partly in section, of a portion of a brake apparatus embodying the invention; Fig. 2 is an enlarged sectional view of a portion of a brake valve device shown in outline in Fig. 1; and Fig. 3 is an enlarged sectional view of a relay valve device shown schematically in Fig. 1.

*Description*

Referring to Fig. 1 of the drawing, the improved fluid pressure brake apparatus comprises the usual brake pipe 1, feed valve device 2, main reservoir 3, engineer's brake valve device 4, brake controlling valve device 5, auxiliary reservoir 6, brake cylinder device 7, cut-off valve device 8, and a safety control portion comprising the remaining components shown in said figure and which will be hereinafter described.

Referring to Figs. 1 and 2 of the drawing, the brake valve device 4 may, for sake of illustration, be of the type shown and described in Instruction Leaflet No. 2606-1, dated February 1950, published by the Westinghouse Air Brake Company and entitled "Operating Instructions, 24-RL Locomotive Brake Equipment"; said device being designated in said leaflet as the "DSE-24 Brake Valve." This brake valve device comprises, briefly, a casing 9 containing a rotary-type valve (not shown) operable by movement of a handle 10 into a running position to establish a fluid pressure supply or brake pipe charging communication from the main reservoir 3 to the brake pipe 1 by way of the feed valve device 2 and a fluid pressure supply pipe 11 connecting the latter device with device 4. The brake valve device 4 further comprises a service application portion 12 which, as shown in Fig. 2 of the drawing, comprises, briefly, a piston 13 slidably mounted in the casing 9 and subject on one side to pressure of fluid in a chamber 14 and on the opposite side to pressure of fluid in a chamber 15. The chamber 15 is adapted to be constantly charged with fluid under pressure from the main reservoir 3 by way of a conduit 16 (Fig. 1), while the chamber 14 is adapted to be vented to atmosphere by way of a safety control conduit 17 or to be charged with fluid under pressure from chamber 15 by way of a bleed port 18 provided in piston 13 for permitting equalization, at a controlled rate, of the pressures of fluid in said chambers 14, 15. A spring 19 disposed in chamber 14 urges the piston 13 into a normal position for thereby defining a normal position of a slide valve 20 disposed in chamber 15 and positively connected to said piston. The piston 13 and thereby the slide valve 20 are adapted to assume an opposite limit or application position upon venting of fluid under pressure from the chamber 14. With the slide valve 20 in application position, a service reduction in the pressure of fluid in brake pipe 1 will be effected and result in a safety control brake application; and, as long as the handle 10 remains in running position, the conduit 17 will be vented to atmosphere by way of the usual lockover port (not shown), in accordance with the usual practice.

Referring now to Fig. 1 of the drawing, the brake controlling valve device 5 may, for sake of illustration be of the type shown and described in the aforementioned leaflet and designated therein as the "D–24 Control Valve." This device 5 comprises valve means (not shown) operative upon an increase in the pressure of fluid in the brake pipe 1, during charging thereof by way of the device 4, to establish a fluid pressure connection between said brake pipe and a pipe 21 connecting said device 5 with the auxiliary reservoir 6; said device 5 being adapted at the same time, to vent the brake cylinder device 7 to atmosphere by establishing a fluid pressure vent communication between a brake cylinder pipe 22 and a vent port (not shown) provided in device 5, for effecting a brake release in the well-known manner. The device 5 is operative upon either a service or an emergency rate of reduction in the pressure of fluid in the brake pipe 1 to cut off communication between said brake pipe and pipe 21 and between the brake cylinder pipe 22 and the aforementioned vent port, and, at the same time, establish a fluid pressure connection between pipes 21 and 22, for effecting either a service or an emergency application of the brakes; the pressure of fluid in the brake cylinder device 7 and pipe 22 being boosted in the usual manner during an emergency application by pressure of fluid in an emergency reservoir (not shown) and means (not shown).

There is shown in Fig. 3 of the drawing a pneumatic relay valve device which is of the type designated in the aforementioned leaflet as an "H–5–A Relayair Valve." The cut-off valve device 8 (Fig. 1) may, for sake of illustration, be of this type, which comprises, briefly, a casing 23, a movable abutment 24, such as a flexible diaphragm and diaphragm follower, mounted in said casing and separating a control chamber 25 from a non-pressure chamber 26. The chamber 26 is constantly open to atmosphere by way of a vent port 27, and the control chamber 25 is adapted to be charged with fluid under pressure or vented to atmosphere by way of a passageway 28. A spring 29 disposed in chamber 26 acts on and urges the movable abutment 24 into one position. An actuating rod 30, coaxially attached at one end to the movable abutment 27, extends through the non-pressure chamber 26 and projects exteriorly thereof in sealing, slidably guided engagement with the wall of an aligned bore 31 formed in casing 23; the projecting end of said rod being operatively connected to a coaxially arranged valve 32 disposed within a chamber 33. The valve 32 is adapted for seating engagement with a seat 34 formed on one end of a plunger 35 in encirclement of one end of a passageway 34a extending through said plunger with its opposite end open to a delivery chamber 37. The plunger 35 is slidably guided within a bore 36 provided in casing 23 and extending from chamber 33 to the delivery chamber 37. A valve 38, formed integrally with the opposite end of plunger 35, is disposed in chamber 37 and is urged toward engagement with a tapered seat 39, formed in casing 23 in encirclement of bore 36, by a spring 40 disposed in said chamber.

With the control chamber 25 vented to atmosphere, the movable abutment 24 will assume its aforementioned one position under action of spring 29. In such position, the valve 32 will be unseated, establishing a fluid pressure communication X between the chamber 33 and delivery chamber 37 by way of passageway 34 in the plunger 35, while the valve 38 will be held seated by action of spring 40. Upon supply of fluid under pressure to the control chamber 25, the movable abutment 24 will assume, against opposition of spring 29, an opposite position in which the valve 32 will be seated and will hold the plunger 35 in an advanced position in which valve 38 is unseated, thereby closing communication X and establishing a fluid pressure communication Y between the delivery chamber 37 and a passageway 41; the communications X and Y being so denoted in Fig. 1 of the drawing.

Referring now to Figs. 1 and 3 of the drawing, the cut-off valve device 8 is connected such that the control chamber 25 is in constant fluid pressure communication with the brake cylinder pipe 22; the delivery chamber 37 is in constant fluid pressure communication with a safety control pipe 42; the chamber 33 is in constant fluid pressure communication with the safety control conduit 17; and passageway 41 is open to atmosphere or may, if preferred, be sealingly plugged, for reasons which will be brought out in subsequent description of operation.

Referring now to Fig. 1 of the drawing, the aforementioned safety control portion of the improved brake apparatus is adapted to require a periodic operation or acknowledgement by the engineman in order to prevent a safety control brake application. The safety portion comprises two identical, interconnected pneumatic relay valve devices 43, 44; a magnet valve device 45, which is optional and may be eliminated if preferred; an atmospheric blowdown reservoir 47 of relatively small volume; a shuttle valve device 48; two identical, preferably foot operable valve devices 49, 50 which the engineman must alternately depress periodically in order to prevent a safety control brake application; and two acknowledging reservoirs 51, 52; all of which aforementioned components will now be described in detail.

The relay valve devices 43, 44 may, for sake of illustration, be of the type shown in Fig. 3 of the drawing and already described in detail.

Referring to Figs. 1 and 3 of the drawing, the device 43 is connected such that the delivery chamber 37 is in constant fluid pressure communication with the pipe 42; the chamber 33 is open to atmosphere; and the passageway 41 is sealingly plugged. The control chambers 25 of devices 43, 44 are chargeable with the fluid under pressure or ventable to atmosphere by way of a pipe 53. The device 44 is also connected such that the delivery chamber 37 is in constant fluid pressure communication with the main reservoir 3 by way of a pipe 54; the chamber 33 is in constant fluid pressure communication with a pneumatically operated whistle 55; and passageway 41 is sealingly plugged. The spring 29 of device 44 is heavier than that of device 43 so that when pressure of fluid in pipe 53 reduces to a certain predetermined value, the device 44 will operate to establish communication X for sounding whistle 55; and then upon a further reduction in pressure in pipe 53 to a predetermined lower value, the device 43 will operate to establish communication X for thereby venting pipe 42 and hence conduit 17 to atmosphere for effecting a safety control brake application. The device 43 should be enclosed in a perforated cage to prevent the engineman from nullifying the safety control by plugging a passageway 33a by way of which chamber 33 is vented to atmosphere, as will be understood from previous description.

The magnet valve device 45 is provided for cutting out the safety control feature under certain predetermined conditions of speed and/or direction of movement of a locomotive and thereby relieving the engineman of the necessity of alternately depressing the foot valve devices 49, 50. The device 45 may be of any well-known type which is adapted, when energized, to establish a fluid pressure communication A between pipes 54 and 53 for thereby effecting automatic suppression of the devices 43, 44 through the medium of fluid at main reservoir pressure in pipe 54; and is adapted, when deenergized, to terminate said communication A and establish a fluid pressure communication B between the pipe 53 and a pipe 56 for requiring periodic, alternate depression of the foot valve devices 49, 50, as will be explained presently. If preferred, however, the device 45 may be eliminated and the pipe 53 connected in constant communication with the pipe 56, in which case the engineman must acknowledge on the foot valve devices 49, 50 except during a manual brake application which produces a pressure of at least 30 p. s. i. in the brake cylinder pipe 22, as will be understood from subsequent description of operation.

The magnet valve device 45 is connected in series with a source of electrical energy, such as a battery 57, and with an engineer's power controller 58 and a power knockout relay device 59.

The controller 58 may be of the well-known type used with electric or diesel-electric locomotives, having a controller handle, designated in the drawings by reference numeral 58a, which is movable to a plurality of different contact positions for controlling speed and direction of movement of a train. The lead wires of magnet valve device 45 may, if desired, be so connected to the controller 58 that said device will be energized only when the controller handle 58a is in such as reverse, idle or low speed contact positions (denoted by legends R, I, and L, respectively, in Fig. 1 of the drawing).

The power knockout device 59 may also be of the usual type used in electric or diesel-electric locomotives for preventing burning of commutators during a safety control brake application. The device 59 may comprise, briefly, a piston 60 slidably mounted in a hollow cylindrical casing 61 and subject at one side to pressure of fluid in a pressure chamber 62 and at the opposite side to action of a spring 63 disposed in a non-pressure chamber 64 constantly open to atmosphere by way of a port 65 in said casing. A contact bar 66 is positively connected to the piston 60 by a rod 67 which projects exteriorly of the chamber 64. The bar 66 is adapted to maintain the magnet valve device circuit closed except when fluid under pressure is supplied to chamber 62 by way of a conduit 68 and causes the piston 60 to advance said bar away from its contacts, as will occur only when the slide valve 20 of service portion 12 (Fig. 2) is in its aforementioned opposite position, according to the usual practice.

It will now be noted that the circuit of the magnet valve device 45 may be opened, and said device consequently deenergized, either by actuation of the controller 58 out of the R, I or L contact positions or by the aforementioned advancement of the contact bar 66 of device 59.

The foot valve devices 49, 50 are identical, the former being shown in detail and the latter in outline. The devices 49, 50 may, for sake of illustration, be of the type disclosed in U. S. Patent No. 1,895,476 issued January 31, 1933, to J. C. McCune. This device comprises, briefly, a casing 69 having a high pressure chamber 70, a control chamber 71, and a delivery chamber 72 and also comprises a resilient diaphragm-type valve 73 for controlling fluid pressure communication between chambers 70, 71 and further comprises a valve 74 for controlling fluid pressure communication between chambers 71, 72. A pedal 75, fulcrumed about a pin 76, carried by the casing, is urged by a spring 77 into an elevated position in which it is shown in Fig. 1 of the drawing and in which the valve 73 is unseated by pressure of fluid in chamber 70 while valve 74, under action of a spring 78 disposed in chamber 72, seats against a tapered seat 79 formed in casing 69, for thereby establishing a fluid pressure communication between chambers 70, 71 and closing chamber 72 from chamber 71. The pedal 75 is adapted to be foot actuated into a depressed position, against resistance of spring 77, for thereby seating the diaphragm valve 73 against an annular seat 80 and, at the same time, advancing through the medium of said valve a fluted stem 81 for unseating valve 74 against resistance of spring 78 and thereby closing chamber 70 from chamber 71 and at the same time establishing a fluid pressure communication between chambers 71, 72.

The devices 49, 50 are connected such that their chambers 70 are chargeable with fluid at main reservoir pressure by way of branches of the pipe 54; their chambers 71 are in constant fluid pressure communication with the reservoirs 51, 52 by way of pipes 82, 83, respectively; and their chambers 72 are in constant fluid pressure communication with oppositely arranged control chambers (not shown) of a shuttle valve device 48 by way of pipes 84, 85, respectively.

The shuttle valve device 48 may be of any well-known type comprising valve means (not shown) for preventing fluid pressure communication between the pipes 84, 85 but operative upon a preponderance of pressure of fluid in either one of said pipes 84 or 85, selectively, to establish a fluid pressure connection between such pipe having fluid at the preponderant pressure and the pipe 56.

The atmospheric blowdown choke 46 and the reservoir 47 are interposed in the pipe 56 for reasons which will be brought out in subsequent description of operation.

A cut-out cock device 86 may be interposed, if desired, in the pipe 42; said cock having a handle 87, adapted to be sealed in an open position to normally prevent termination of fluid pressure communication through said cock, but adapted to be moved into a closed position upon breaking of the seal for not only permitting removal or repair of the safety portion of the apparatus without depletion of main reservoir pressure by way of chamber 15, but also preventing undesired safety control brake applications in the event of a leakage condition or a malfunction in said safety portion.

Operation

In operation, assume initially that the main reservoir 3 is charged with fluid under pressure; that the handle 10 of brake valve device 4 is in running position; that the handle 58a of controller 58 is in contact position R, I or L; and that the brakes are released.

Under these assumed conditions, the magnet valve device 45 will be energized and establish communication A, by way of which fluid at main reservoir pressure in pipe 54 will charge the pipe 53 and thereby maintain the relay devices 43, 44 in their suppressed positions for establishing communications Y, respectively. It will therefore be unnecessary for the engineman to depress the foot pedal 75 of either device 49 or 50, and he may consequently allow these pedals to assume their aforementioned elevated position, in which the reservoirs 51, 52 will be charged with fluid under pressure from the main reservoir 3 by way of pipe 54, chambers 70 and 71, and the respective pipes 82, 83. The chambers 72 of devices 49, 50 will be at substantially atmospheric pressure by way of the shuttle valve 48 and blowdown choke 46, and the reservoir 47 also will be at atmospheric pressure by way of said choke. Since the brakes are released, the brake cylinder pipe 22 will be vented to atmosphere by way of the brake controlling valve device 5, and consequently the cut-off valve device 8 will establish communication X in which the safety control conduit 17 and hence the safety control pipe 42 are charged with fluid under pressure by way of chamber 15 and bleed port 18 in piston 13; the slide valve 20 (Fig. 2) of device 4 being in its aforementioned normal position.

Assuming now that the engineman desires to increase the speed of the vehicle into the predetermined range in which safety control is effective, he first depresses the pedal 75 of either device 49 or 50 and then moves the controller 58 into a contact position in which the magnet valve device circuit is opened and the magnet device 45 is therefore deenergized; or if preferred, said pedal and controller may be actuated concurrently.

By virtue of this movement of pedal 75 (which for sake of illustration will be deemed to be that of device 49) the pipe 56 and hence reservoir 47 will be charged with fluid under pressure from reservoir 51 by way of pipe 82, chamber 71, unseated valve 74, chamber 72, pipe 84, and shuttle valve 48. As a consequence thereof, upon the aforementioned deenergization of magnet valve device 45, fluid under pressure will flow by way of pipe 56, communication B in device 45, and pipe 53 to the control chambers 25 (Fig. 3) of devices 43, 44 thereby holding said devices 43, 44 in their respective suppressed positions in which communications Y are maintained.

With this fluid pressure communication thus established between the pipes 53 and 56, the pressure of fluid in the control chambers 25 (Fig. 3) of devices 43, 44 and reservoirs 51, 47 will blow down slowly by way of the atmospheric blowdown choke 46. When the pressure of fluid in the control chamber of device 44 has been reduced to the aforementioned predetermined value, said device will operate to establish communication X whereby fluid at main reservoir pressure in pipe 54 will be supplied to the whistle 55, thereby sounding a warning. After the whistle begins to sound, the engineman is afforded a reasonable interval of time within which to depress the pedal 75 of device 50 for thereby recharging the pipe 56 and control chambers 25 (Fig. 3) of devices 43, 44 with fluid under pressure from the acknowledging reservoir 52, which, while said pedal was in its elevated position, had been charged with fluid at main reservoir pressure, in the manner previously described. If the engineman makes the required acknowledgement promptly, i. e., depresses pedal 75 of device 50, fluid under pressure thus supplied to pipe 56 will flow to the control chambers 25 (Fig. 3) of the devices 43, 44 thereby causing the device 44 to reestablish communication Y and disconnect the whistle 55. At or about the time the engineman depresses the foot pedal 75 of device 50, he should release the pedal 75 of device 49 so that it may assume its elevated position under action of spring 77 and thereby establish the previously described charging communication between the pipe 54 and reservoir 51, so that before pressure of fluid in the reservoir 52, pipe 56 and the control chambers of devices 43, 44 becomes reduced to a degree which would permit movement of device 43 to its upper position, a fully charged reservoir 51 will be available for connection to said chambers through actuation of pedal 75 of device 49 into depressed position.

Assume now, that with the pedal 75 of device 50 depressed, pressure of fluid in the control chambers of devices 43, 44 has been depleted to the predetermined value and has resulted in sounding of the whistle 55, in the manner previously explained. If the engineman fails to, or is unable to, respond to the warning by depressing the pedal 75 of device 49 and releasing that of device 50, the pressure of fluid in the control chambers of devices 43, 44 will continue to blow down toward atmosphere by way of choke 46 until, at the aforementioned predetermined lower value of pressure, the device 43 operates to establish communication X, whereby pipe 42 will be vented to atmosphere. With pipe 42 vented, fluid under pressure will be vented from the chamber 14 of device 4 by way of the conduit 17 and communication X in cut-off valve device 8. Upon venting of chamber 14, pressure of fluid in chamber 15 will cause the piston 13 to move, against resistance of spring 19, into its aforementioned opposite position, thereby carrying the slide valve 20 into its aforementioned opposite position. With the slide valve 20 in this position, a service reduction in the pressure of fluid in brake pipe 1 will occur and effect a safety control brake application and, at the same time, conduit 17 will be independently vented to atmosphere by way of the aforementioned lock-over port in device 4, and conduit 68 will be charged with fluid under pressure for moving the contact bar 66 of device 59 away from its contacts, thereby causing a power knockout to prevent burning of the commutators, as brought out in previous description.

During this safety control brake application, fluid under pressure supplied to the brake cylinder pipe 22 and brake cylinder device 7 by way of device 5 will flow by way of a branch of pipe 22 to the control chamber 25 (Fig. 3) of cut-off valve device 8, thereby causing said device 8 to establish communication Y whereby the pipe 42 is vented to atmosphere and communication X is terminated by seating of the valve 32 (Fig. 3) in device 8, thereby deadending conduit 17 in chamber 33 (Fig. 3) of device 8. Since the conduit 17 is still open to atmosphere by way of the aforementioned lock-over port, the engineman, in order to recapture control of the vehicle, must now move the handle 10 of brake valve device 4 into a lap position, in accordance with the usual practice, for thereby closing off said port from atmosphere; whereupon the chamber 14 and hence conduit 17 will be slowly charged with fluid at main reservoir pressure by way of chamber 15 and bleed port 18 in piston 13. During this slow charging operation, the engineman should move the controller handle 58a into idle position I, because in accordance with the usual practice power will remain knocked out until said controller is moved into an idle or off position. As the pressure of fluid in chamber 14 approaches equalization with that of chamber 15, the piston 13 will be returned to its normal position by action of spring 19 and will consequently carry the slide valve 20 to its normal position.

With the slide valve 20 returned to its normal position, communication will be disestablished between conduit 17 and the aforementioned lock-over port and conduit 68 will be vented to atmosphere. The handle 10 of brake valve device 4 may now be moved into such as running position for recharging the brake pipe 1 and consequently venting the brake cylinder pipe 22 and brake cylinder device 7 through previously described operation of the brake controlling valve device 5. During this venting of pipe 22, the cut-off valve device 8 will successively disestablish communication Y and establish communication X, thereby effecting a fluid pressure connection between the safety control conduit 17 and safety control pipe 42.

With conduit 68 vented to atmosphere by way of slide valve 20, the contact bar 66 of power knockout device 59 will reengage its contacts; and since the power controller 58 had been previously moved to idle contact position I, the magnet valve device 45 will thus be energized and establish communication A which, in turn, results in suppression operation of devices 43, 44 and establishment of communications Y in said devices 43, 44, respectively, as explained above.

The conditions now prevailing will be those initially assumed in above description of operation.

Assume now, that with the handle 10 of brake valve device 4 in running position and the magnet valve device 45 energized, the engineman makes a manual brake application. The brake cylinder pipe 22 and brake cylinder device 7 will consequently be charged with fluid under pressure. If the pressure of fluid in pipe 22 is less than the usual predetermined minimum of approximately 30 p. s. i., the cut-off valve device 8 will maintain the communication X open; but if such pressure exceeds said minimum, said device will close communication X and establish communication Y. In either event, the engineman need not depress the foot pedal 75 of either device 49 or 50 because the devices 43, 44 will remain in their suppressed position due to pressure of fluid supplied through communication A in the magnet valve device 45. Thus pipe 42 will either be charged with fluid at main reservoir pressure by way of conduit 17 and communication X in device 8 or else said conduit will be deadended by the establishment of communication Y in said device while pipe 42 will be vented to atmosphere, according to whether pressure in pipe 22 is less than or greater than the illustratively assumed 30 p. s. i.

If, however, at the time the engineman desires to make a manual brake application the controller 58 is in such position that the magnet valve device 45 is denergized, then simultaneously with movement of handle 10 of device 4 into a brake application position, the engineman should move the controller 58 into idle contact position I so as to prevent burning out of the commutators; which will result in energizing the device 45 so that the devices 43, 44 will accordingly assume their suppressed position.

Assume now that with the brakes released and the safety control feature in operation, the engineman inadvertently removes his foot momentarily from the pedal 75 of device 49 or 50 or it slips from said pedal. There is a sufficient volume of fluid in reservoir 47 to provide a momentary delay before a safety control brake application will occur, and the engineman may recapture control of the vehicle by depressing one or the other of the pedals 75 within this delay period. The reservoir 47 also assures that, during the acknowledging operation of shifting from one pedal 75 to the other, a momentary delay will not cause a safety control brake application. If desired, however, reservoir 47 may be eliminated so that a safety control brake application will be initiated almost simultaneously with removal of the engineman's foot from pedal 75 of device 49 or 50.

*Summary*

It will now be seen, according to the invention, that in order to prevent an automatic safety control application of the brakes, means have been provided which require the engineman to periodically actuate two levers alternately, first to one position and then to another position, with a reasonable time after the sounding of a warning signal.

The improved apparatus also provides means for automatically cutting out the safety control feature under preselected conditions, such as when the vehicle is standing, reversing or proceeding ahead at low speeds, as during switching.

The improved apparatus further provides for a momentary delay before initiation of a safety control brake application in the event the engineman's foot slips from the pedal of the safety foot valve pedal or is inadvertently removed momentarily therefrom.

Having now described the invention, what I claim as new and desire to secure by Letters Patent, is:

1. In a fluid pressure brake apparatus of the type comprising a safety control conduit normally charged with fluid under pressure and means operative upon venting of said conduit to effect a safety control brake application, the combination of a second conduit, a pair of pipes, first valve means operative to selectively open to said second conduit whichever one of said pipes contains fluid at the higher pressure, a source of fluid under pressure, a pair of valve devices each having operator controlled actuating means movable selectively into a first position for charging a respective chamber with fluid under pressure from said source and into a second position for disconnecting said chamber from said source and opening said chamber to a respective one of said pipes, means for releasing fluid under pressure from said second conduit at a controlled rate, a warning device, second valve means controlled by pressure of fluid in said second conduit and operative only upon a predetermined reduction in fluid pressure in said second conduit to effect operation of said warning device, and third valve means controlled by pressure of fluid in said second conduit and operative only upon a further reduction in such pressure to a predetermined lower value to vent said safety control conduit to atmosphere.

2. In a fluid pressure brake apparatus of the type comprising a source of fluid under pressure, a brake pipe normally charged with fluid under pressure emanating from said source, a brake controlling valve device operative upon a reduction in brake pipe pressure to effect a brake application, a safety control conduit normally charged with fluid under pressure and means operative upon venting of fluid pressure from said conduit to effect such reduction in brake pipe pressure, the combination of a second conduit, a pair of acknowledging reservoirs, a pair of operator controlled valve devices each having a first position in which a fluid pressure charging communication is established between said source and one of said reservoirs and each having a second position in which said communication is disestablished and a fluid pressure supply communication is established between the respective reservoir and said second conduit, shuttle valve means interposed between said second conduit and said operator controlled valve devices for preventing fluid pressure communication between said devices but permitting fluid pressure communication selectively between one of said devices and said second conduit according to which of said devices, being in its said second position, has the preponderating fluid pressure in its respective reservoir, means interposed in said second conduit for bleeding fluid pressure to atmosphere at a controlled rate, a warning device, and first and second relay valve means both controlled by pressure of fluid in said second conduit and occupying a normal position when such pressure exceeds a chosen value, said first relay means being operative upon a reduction of fluid pressure in said second conduit to said chosen value to effect operation of said warning device, and said second relay means being operative upon a further reduction in fluid pressure in said second conduit to a predetermined lower value to vent said safety control conduit to atmosphere.

3. The combination according to claim 2, including magnet valve means interposed between said bleed means and said relay valve devices and operative when energized for disconnecting said relay valve devices from said bleed means and establishing a fluid pressure connection between said source and said relay valve devices for holding the same in their respective normal positions independently of said operator controlled valve devices and operative when deenergized for terminating said connection and establishing fluid pressure connection between said bleed means and said relay valve devices and operator-controlled means operable to a variety of positions for controlling vehicle speed and concurrently controlling energization and deenergization of said magnet valve means.

4. The combination according to claim 2, including a reservoir constantly open to said second conduit for supplying sufficient fluid under pressure to said second relay valve means to momentarily delay operation thereof to vent said safety control conduit in the event the operator controlled devices are momentarily both in their respective first positions.

5. In a fluid pressure brake apparatus of the type comprising a source of fluid under pressure, a normally charged brake pipe, a normally vented brake cylinder pipe, a brake controlling valve device operative upon a reduction in brake pipe pressure to effect a brake application by charging said brake cylinder pipe with fluid under pressure, a brake valve device having a normally charged safety control conduit and comprising means operative upon venting of fluid pressure from said conduit to effect a reduction in brake pipe pressure, and a cut-off valve device controlled by pressure of fluid in said brake cylinder pipe, the combination of a second conduit, a pair of acknowledging reservoirs, a pair of operator controlled valve devices each having a first position in which a fluid pressure charging communication is established between said source and one of said reservoirs and each having a second position in which said communication is disestablished and a fluid pressure supply communication is established between the respective reservoir and said second conduit, shuttle valve means interposed between said second conduit and said operator controlled valve devices for preventing fluid pressure communication between said devices but permitting fluid pressure communication selectively between one of said devices and said second conduit according to which of said devices, being in its said second position, has the preponderating fluid pressure in its respective reseervoir, means interposed in said second conduit for bleeding fluid pressure to atmosphere at a controlled rate, a pneumatically operated warning device, and first and second relay valve means both movable to a normal position by pressure of fluid in said second conduit in excess of a chosen value, said first relay valve means being operative upon a reduction in pressure of fluid in said second conduit to said chosen value to establish a fluid pressure connection between said source and said signal device, and said second relay valve means being operative upon a further reduction in pressure of fluid in said second conduit to a chosen lower value to vent said safety control conduit to atmosphere, said cut-off valve device being interposed between said safety control conduit and said second relay valve means for normally maintaining a fluid pressure connection therebetween but operative upon attainment of a preselected pressure of fluid in said brake cylinder pipe to dead end said safety control conduit and thereby terminate such fluid pressure connection.

6. In a fluid pressure brake apparatus for a vehicle, in combination, a brake pipe, a control conduit, a brake controlling valve device adapted to normally maintain said control conduit charged with fluid under pressure and responsive to a reduction in pressure in said control conduit to effect a reduction in pressure in said brake pipe for effecting a brake application, a second conduit, a pair of pipes, a pair of valve devices each operable by movement of a respective lever to one position for supplying fluid under pressure to a respective chamber and to another position for terminating such supply and opening said respective chamber to a corresponding one of said pipes, first valve means subject opposingly to pressures of fluid in said pipes and operative to open said second conduit to whichever of said pipes contains fluid at the preponderating pressure, means for releasing fluid pressure from said second conduit at a controlled rate, and second valve means responsive to a reduction in pressure in said second conduit below a predetermined value to cause release of fluid pressure from said control conduit and inoperative for effecting such release so long as pressure in said second conduit exceeds said predetermined value.

7. In a fluid pressure brake apparatus of the type comprising a safety control conduit normally charged with fluid under pressure and means responsive to release of fluid under pressure from said conduit to initiate a safety control application of the brakes on a vehicle, the combination of a second conduit, means for releasing fluid under pressure from said second conduit at a controlled rate, a third conduit charged with fluid under pressure, first valve means inoperative for releasing fluid under pressure from said safety control conduit so long as pressure of fluid in a chamber exceeds a predetermined value and responsive to a reduction in such pressure below said predetermined value to release fluid under pressure from said safety control conduit, a pair of pipes, a pair of volumes for storing fluid under pressure, a pair of operator controlled valve devices each movable to one position for supplying fluid under pressure from said third conduit to a corresponding one of said volumes and to another position for terminating such supply and opening such volume to a corresponding one of said pipes, shuttle valve means operative to open to said second conduit whichever one of said pipes contains fluid at the preponderating pressure, second valve means having a normal position for opening the chamber of said first valve means to said second conduit and another position for closing off said chamber from said second conduit and opening said chamber to a branch of said third conduit for supplying fluid under pressure to said chamber independently of said operator controlled valve devices, and other operator controlled means operative in a first position to effect one rate of vehicle speed and also concurrently cause operation of said second valve means to its said other position and operative in a second position to effect a faster rate of vehicle speed and concurrently cause operation of said second valve means to its said normal position, such that the operator is relieved from the necessity of actuating said operator controlled valve devices while said other operator controlled means is in its said first position.

8. In a fluid pressure brake apparatus for a vehicle, in combination, a brake pipe, a control conduit, a brake controlling valve device adapted to normally maintain said control conduit charged with fluid under pressure and responsive to a reduction in pressure in said control conduit to effect a reduction in pressure in said brake pipe for effecting a brake application, a second conduit, a pair of pipes, a pair of valve devices each operable by movement of a respective lever to one position for supplying fluid under pressure to a respective chamber and to another position for terminating such supply and opening said respective chamber to a corresponding one of said pipes, first valve means subject opposingly to pressures of fluid in said pipes and operative to open said second conduit to whichever one of said pipes contains fluid at the preponderating pressure, means for releasing fluid under pressure from said second conduit at a controlled rate, second valve means responsive to a reduction in pressure in said second conduit below a predetermined value to cause release of fluid under pressure from said control conduit and inoperative for effecting such release so long as pressure in said second conduit exceeds said predetermined value, a source of fluid under pressure, an operator-controlled power controller device movable to any one of a plurality of positions for controlling speed and direction of said vehicle, another valve device interposed in said second conduit and responsive to positioning of said controller device in at least one of said positions to close off said second valve means from said fluid pressure releasing means and supply fluid under pressure to said second valve means from said source and responsive to positioning of said controller device in the remainder of said positions to close off said second valve means from said source and open said second valve means to said fluid pressure releasing means.

9. The combination according to claim 8, including a warning device, third valve means controlled by pressure of fluid in a chamber open to said second conduit and second valve means and operative only upon a reduction in pressure in said second conduit to a selected value higher than said predetermined value to effect operation of said warning device.

References Cited in the file of this patent

UNITED STATES PATENTS 1,545,751    Fournia              July 14, 1925

FOREIGN PATENTS 335,634    Italy               Feb. 7, 1936